4 Sheets--Sheet 1.

L. WORCESTER.

Machines for Boring and Mortising Blind-Stiles.

No. 5,568. Reissued September 9, 1873.

Inventor.
Leonard Worcester
C. Mason
Atty

Witnesses.
E. H. Johnson
N. Crawford

AM. PHOTO-LITHOGRAPHIC CO. N.Y. (OSBORNE'S PROCESS)

L. WORCESTER.

Machines for Boring and Mortising Blind-Stiles.

No. 5,568. Reissued September 9, 1873.

Inventor.
Leonard Worcester
by A. Bergin
Atty

Witnesses.
E. H. Johnson.
N. Crawford

AM. PHOTO-LITHOGRAPHIC CO. N.Y. (OSBORNE'S PROCESS)

4 Sheets--Sheet 3.
L. WORCESTER.
Machines for Boring and Mortising Blind-Stiles.
No. 5,568. Reissued September 9, 1873.
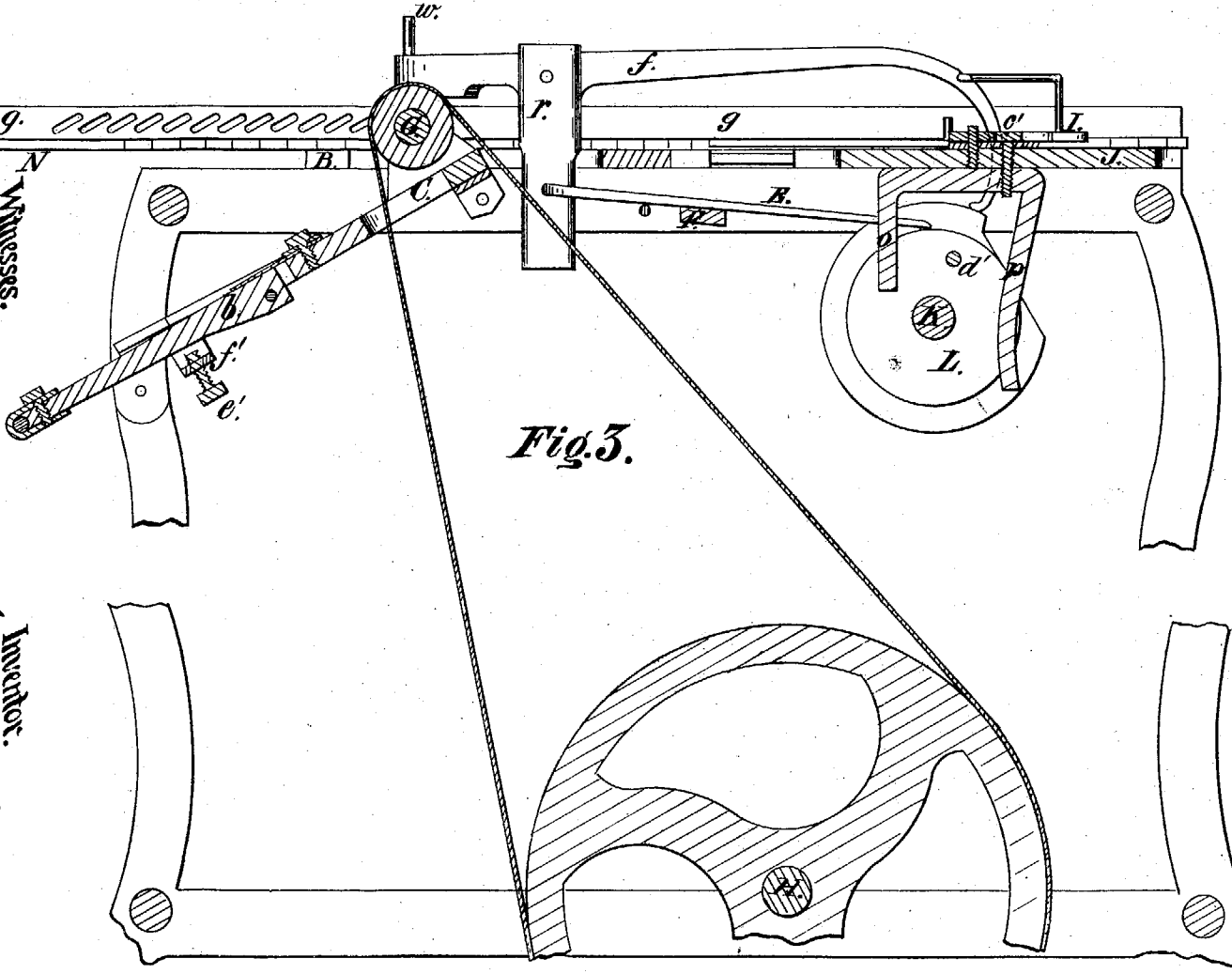
Witnesses.
E. N. Johnson
N. Cramford
Inventor.
Leonard Worcester
Atty.
A.M. PHOTO-LITHOGRAPHIC Co. N.Y. (OSBORNE'S PROCESS.)

4 Sheets--Sheet 4.
L. WORCESTER.
Machines for Boring and Mortising Blind-Stiles.
No. 5,568. Reissued September 9, 1873.
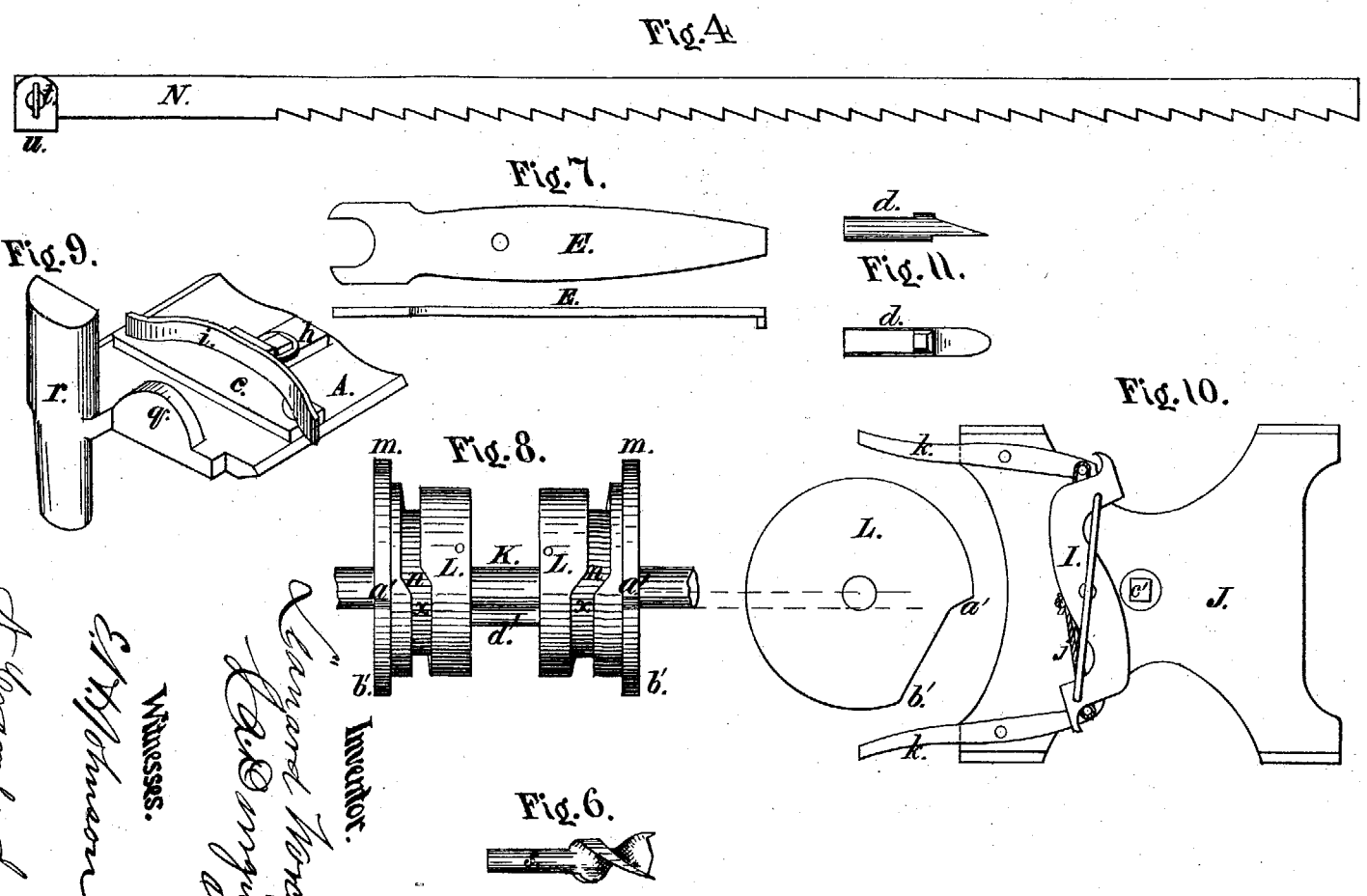
Inventor.
Leonard Worcester
L. A. Dargin
atty
Witnesses.
E. H. Johnson
N. Cramford
AM. PHOTO-LITHOGRAPHIC Co. N.Y. (OSBORNE'S PROCESS.)

UNITED STATES PATENT OFFICE.

LEONARD WORCESTER, OF LEBANON, NEW HAMPSHIRE.

IMPROVEMENT IN MACHINES FOR BORING AND MORTISING BLIND-STILES.

Specification forming part of Letters Patent No. 24,688, dated July 5, 1859; extended seven years; reissue No. 5,568, dated September 9, 1873; application filed March 26, 1873.

*To all whom it may concern:*

Be it known that I, LEONARD WORCESTER, of Lebanon, in the county of Grafton and State of New Hampshire, have invented a new and Improved Machine for Mortising and Boring Blind-Stiles, of which the following is a specification:

My said invention relates to the boring and mortising of window-blind stiles, into which the shade-slats are inserted; and the invention consists in a certain novel construction and arrangement of parts, which have for their object an automatically-acting machine, capable of rapid work and ease of operation, as hereinafter more fully described.

Figure 1:
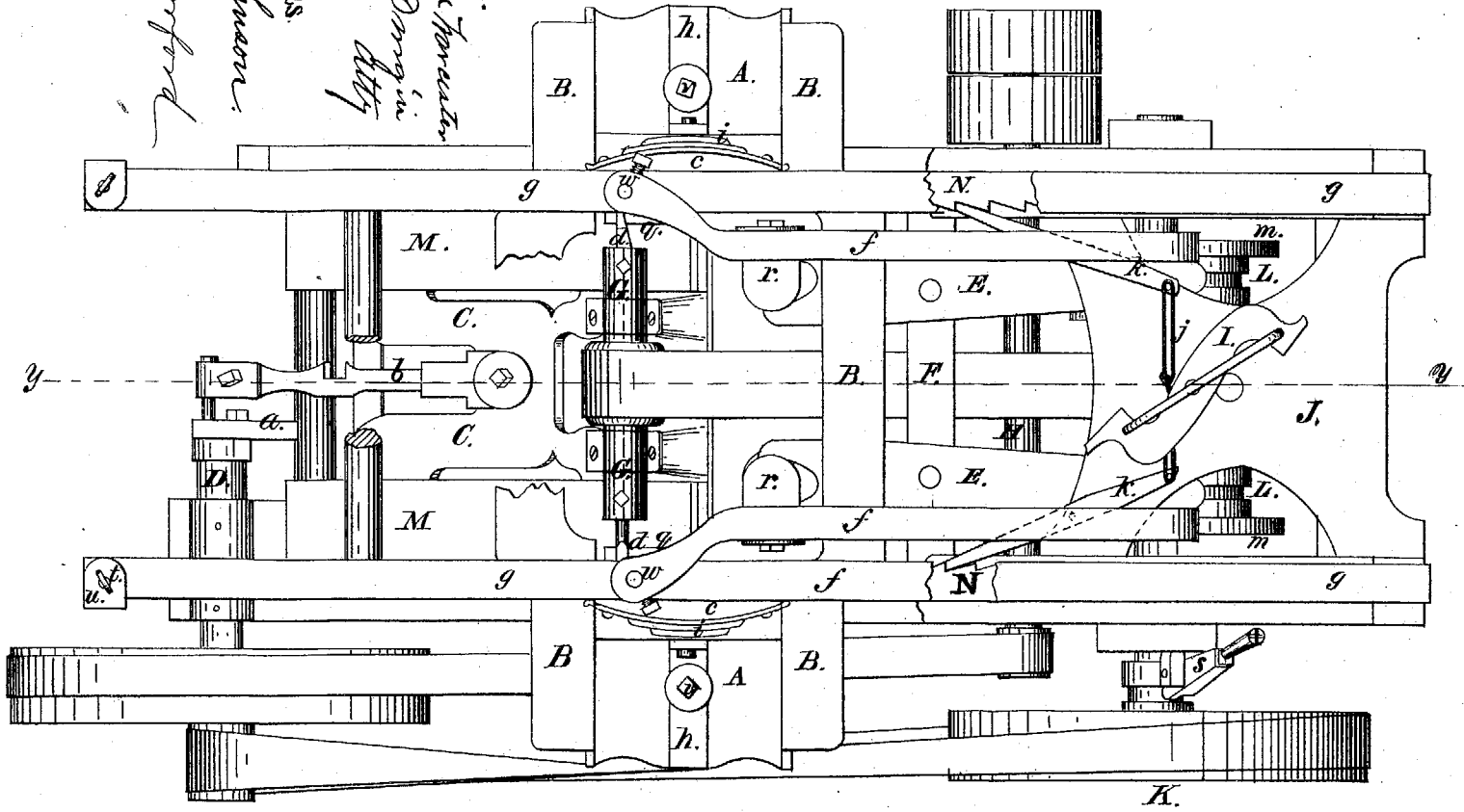
Figure 2:
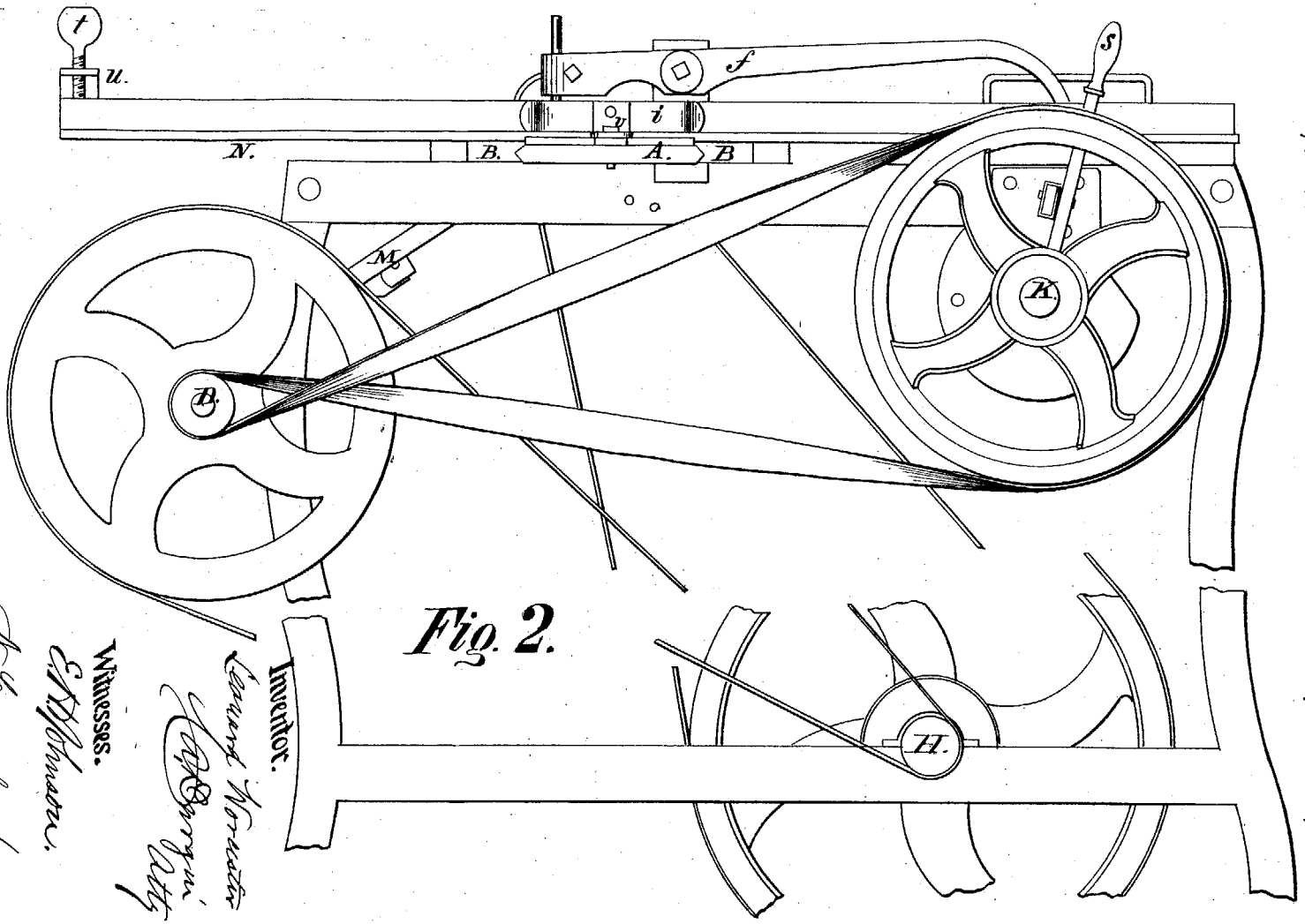

Figure 1 is a top view of the machine. Fig. 2 is a side elevation thereof; Fig. 3, a section in the line *y y* of Fig. 1. The remaining figures represent detached portions of the machine.

Similar letters of reference indicate like parts in all the drawings.

The frame of the machine is constructed of any material so as to be strong and substantial, cast-iron usually being employed, the parts being bolted together, and of such shape as to readily support the operative parts of the machine. The machine is so constructed and arranged that two stiles can be simultaneously operated upon. The position of the stiles, when placed in the machine to be acted upon, is shown in Figs. 1, 2, and 3. Each stile is secured to a notched or pattern feeding-plate, N, by means of a curved strap, *u*, and set-screw, *t*, or by other suitable means, and each feeding-plate N rests upon the transversely-movable carriage A. The carriages A A are supported and guided in their movements by the transverse plates B, which are secured to the upper side pieces of the frame of the machine. The lug *q*, which rises from the inner end of each carriage A, and the opposite ledge *c*, which rises from the upper face of said carriage, form a guiding-way for the pattern feeding-plate N, which rests upon the same. When a stile is placed in position upon the carriage A its outer surface is acted upon by a spring, *i*, at the inner end of the slotted plate *h*, which plate can be secured in any desired position upon the carriage by means of the screw *v*. The shaft G, which has sockets in each of its ends for the reception of required mortising or boring bits *d* or *s*, works in journal-boxes that are secured to the upper end of the reciprocating carriage C, which is supported and guided in its movements by inclined ways M M that are secured to the frame of the machine in the manner shown in Fig. 3, or supported in any other similar way.

Fig. 6 is a representation of a full-sized bit generally used for boring pivot-holes in blind-stiles, and Fig. 11 shows a bit for forming mortises in blind-stiles by adding an obliquely-reciprocating movement to the rotary movement of said bit or cutter. The blind-stiles *g g* are held in the proper position during the operation of boring or mortising them, and are then released and moved outward and forward to the next position of the bore or mortise, and successive operations, as follows: An upright, *r*, which is cast in one piece with or is otherwise secured to one of the inner angles of each carriage A, rises above and descends below the carriage, as shown in Fig. 9. To the upper portion of the upright *r* of each carriage A a curved lever, *f*, is jointed, as shown in the drawings. The short end of each lever *f* curves outward a sufficient distance to bring the vertical aperture therein, which receives the adjustable holder *w* over the center of the stile *g* on that side of the machine. The long ends of the levers *f f* curve downward and bear upon the cams *m m*, which radiate from the outer ends of the cylinders L on the shaft K, with sufficient force to cause the faces of the holders *w w* in the opposite ends of said levers to bear so firmly on the upper surfaces of the stiles as to hold them in position upon the carriage A A while they are being operated upon by the mortising or boring bit in the shaft G. The two levers E E, which are pivoted to the transverse pieces F of the frame of the machine, serve to connect the descending projections *r r* of the carriages A A with cam-grooves *n x n x* in the cylinders L L, in the manner represented in the drawings—namely, the downward projection *r* from each carriage A is received into a concavity in the left-hand end of its lever E, and a descending tooth from the opposite end of said lever fits into its actuating cam-groove *n x* in one of the cylinders L.

When the descending teeth of the levers E E are at the points *x x* of the cam-groove in the cylinders L L the carriages A A will be at their extreme outermost position, and the stiles *g g* will be entirely beyond the reach of the bits in the ends of the shaft G, and just before the said lever-teeth reach the aforesaid positions in the cam-grooves *n x*, the curved ends of the levers *f f* descend into the notches *a′ b′* in the cams *m m*, and release the stiles from pressure of the holders *w w* at the opposite ends of the said levers.

The requisite forward feeding movements are imparted to the stiles *g g* in the following manner: Spring-pawls *k k*, which are combined with the sliding carriage J, work into the notches in the feeding-plate N N. A short leg, *o*, and a long leg, *p*, which descend from the under surface of the carriage J, are successively acted upon by the horizontal pin *d′*, (which is secured to the inner ends of the cylinders L L,) in such a manner as to provide the required movements of said carriage, the forward movement of the carriage being imparted thereto the moment after the action of the cams and cam-grooves of the cylinder L L upon the levers E E and *f f* have moved the said stiles outward and released them from the holders. As soon as movement has been imparted to the stiles *g g* the curved ends of the levers *f f* pass out of the notches in the cam *m m*, and bear upon the peripheries of the same, which movement brings the holders *w w* at the opposite ends of said levers down upon the stiles with any desired pressure.

The cam-grooves *n x* in the cylinders L L are of such oblique shape that the rotation of the said cylinders will gradually force the tooth ends of the levers asunder, and thereby cause the opposite ends of said levers to draw the carriages and the stiles *g g* inwardly during the time that the teeth of the levers are passing from the points *x* to the points *n* in said grooves, and then the abrupt inclination in the grooves will suddenly draw the outer of said grooves inwardly for the purpose of causing the opposite ends of the same to suddenly force outwardly the stiles *g g* beyond the reach of the bits in the ends of the shaft G.

A reciprocating movement is imparted to the carriage C, which carries shaft G, by means of the adjustable crank *a* on the shaft D, pitman *b*, which connects the former with the latter, as shown in the drawings.

When it is desired to form pivot-holes in the stiles (for rolling slats) the shaft G is secured in a permanent position by the screw *e′* in the cross-piece *f′* being turned up into a notch or recess in the pitman *b*, or other suitable means.

The pivots of the pawls *k k* are located near the centers of the lengths of the same. The outer ends of said pawls are connected to each other by means of spring *j* of any proper construction. The actuating ends of the pawls *k k* can be simultaneously drawn inwardly and secured in such a position that they will not act upon the teeth of the feeding-plates N N by means of the pivoted hand-piece I, in the manner shown in Fig. 10.

A small pulley on one end of the driving-shaft H is banded to a large pulley on the crank-shaft D, and a large central pulley on the said driving-shaft is banded to a small pulley on the center of the bit-carrying shaft G.

Motion is imparted to the cylinders L L by means of a band, which connects a small pulley on the crank-shaft D with a large pulley on the shaft K.

I do not intend to restrict myself to any precise shape or special arrangement of the respective parts of my machine, but claim the right to alter or vary them so long as it keeps within the spirit of my invention.

I claim—

1. The combination of the following elements or instrumentalities, namely: A reciprocating carriage for holding and presenting the stile to the cutter, a pattern for spacing the mortises to be cut, a reciprocating cutter for cutting the mortises, and a feeing mechanism for automatically feeding the stiles for the successive mortises, all acting in co-operative relation with each other, substantially in the manner described and specified.

2. The combination of the following elements or instrumentalities, namely: A reciprocating carriage for holding and presenting the stile to the cutter, a pattern for spacing the mortises to be cut, a reciprocating cutter for cutting the mortises, an automatic feed for feeding the stiles, and an automatic clamp for clamping and releasing the stile for the operations of feeding and cutting, substantially in the manner described and specified.

3. A rotary cutter-head carrying cutters at both ends combined with an inclined reciprocating frame, and so arranged as to automatically and simultaneously cut mortises in or bore a pair of blind-stiles as they are presented to the cutters, substantially in the manner described and specified.

4. The combination and arrangement of the transversely-reciprocating carriages A A with the cam-cylinders L L and vibrating levers E E and *f f*, constructed and operating substantially in the manner described.

5. An organized machine for automatically mortising and boring blind-stiles, constructed and operating substantially as described and specified.

LEONARD WORCESTER.

Witnesses:

KITTREDGE HASKINS,
CHARLES B. EDDY.